Patented Feb. 2, 1932

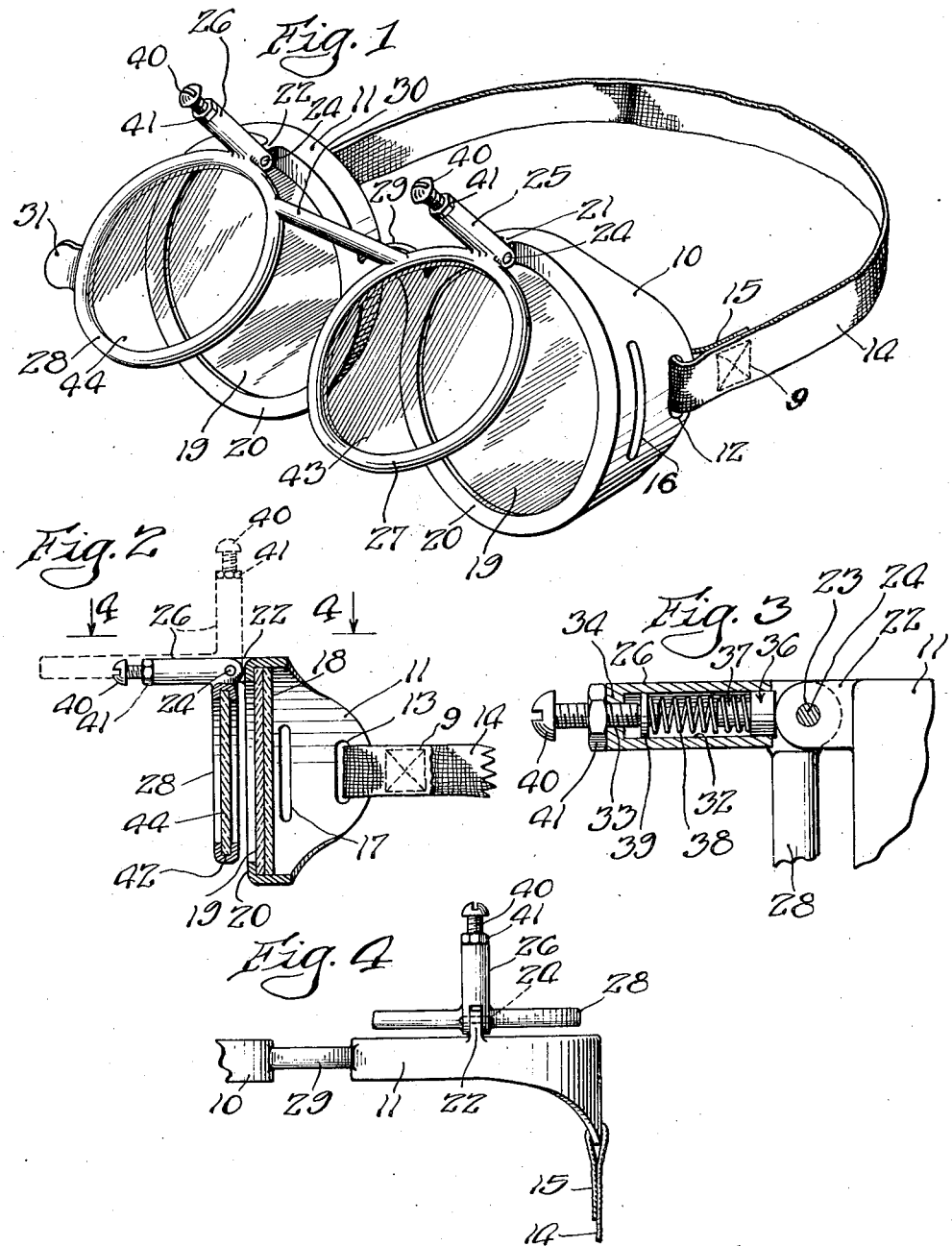

1,843,833

UNITED STATES PATENT OFFICE

LESLIE E. PARSONS, OF LORENZO, NEBRASKA

GOGGLES

Application filed June 20, 1930. Serial No. 462,629.

This invention relates to certain novel improvements in goggles and has for its principal object the provision of an improved construction of this character which will be highly efficient in use and economical in manufacture.

The salient object of this invention is the provision of an improved construction in goggles of the character described herein which embodies movable dark lenses disposed exteriorly of stationary clear lenses so that the wearer may, when not using the dark lenses, raise them out of the line of vision and thus eliminate the necessity of wearing two sets of goggles.

Another object of the invention, ancillary to the foregoing, is the provision of an improved construction for holding the dark lenses out of the line of vision when not in use, without the necessity of moving the clear lenses and while permitting vision therethrough.

A further object of the invention is the provision of a construction in goggles which is adaptable for use in the various trades requiring dark lens goggles for protection against lights injurious to the eyes, such as in welding, while being likewise adaptable for use when the wearer needs only protection against flying sparks, chips of metal and the like, such as in emery wheel grinding or the like.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a perspective view of my invention showing the dark lenses in partly elevated position;

Fig. 2 is a sectional detail view, partly in elevation, showing the arrangement of the dark lenses with respect to the clear lenses;

Fig. 3 is a sectional detail view of the structure employed for holding the dark lenses out of the line of vision; and Fig. 4 is a fragmentary top plan view of the invention, taken substantially on the line 4—4 on Fig. 2.

Referring to the drawings wherein a preferred embodiment of my invention is illustrated, 10 and 11 indicate similar eye pieces which are joined by a nose piece 29 and openings 12 and 13 are provided in these eye pieces. Projecting through these openings are the end portions 15 of a head strap 14 inserted. The head strap 14 is formed of any suitable elastic material and the end portions 15 are attached to the body portion in any approved manner such as by stitching 9. Suitable vent holes 16 and 17 are provided in the eye pieces 10 for a purpose well understood in the art.

In the eye pieces 10 and 11 I provide double lenses 18 and 19 of suitable clear white glass and these lenses are disposed in parallel alignment with the outer lens 19 of each pair abutting the inner surface of an annular flange 20 provided in each of the eye pieces 10 and 11. The lenses 18 and 19 may be secured in position in any approved manner employed in the art and I provide the double clear lenses 18 and 19 so that in case the outer lens 19 is broken by the impact of any object such as by a flying chip or splinter of steel the inner lens 18 will protect the user's eye.

Provided on the eye pieces 10 and 11 at the top thereof are outwardly projecting lugs 21 and 22, in which openings 23 are provided. Disposed in the openings 23 are pins 24 which are retained therein in any approved manner such as by riveting and journaled on these pins 24 are similar housings 25 and 26 which have frames 27 and 28 formed integrally therewith at the base portions thereof and these frames are joined by a crosspiece 30. An ear 31 is preferably formed on one of the frames 27 and 28 or I may provide an ear portion on each frame to facilitate lifting the dark lenses, presently to be described, out of the line of vision.

The housings 25 and 26 have longitudinally extending passages 32 formed therein and these passages terminate exteriorly in threaded openings 33 provided in the end walls 34 of the housings. Disposed in each of the housings 25 and 26 is a stud 36, the rear end portion of which has abutting engagement with the lug 22 as best shown in Fig. 3. The studs 36 include constricted portions 37 on each of which is mounted one end of a coil spring 38. The opposite end of each of the coil springs 38 is secured to a stop 39 by means of soldering or the like and these stops 39 are movable through the passage 32 for a purpose to be described presently.

Projecting through the openings 33 are screws 40, the inner ends of which abut the stops 39 and these screws 40 carry nuts 41 exteriorly of the housings and it will be manifest therefore that when the frames 27 and 28 are raised into position at an angle with respect to the lenses 19 the springs 38 will force the studs 36 into frictional engagement with the lugs 22 thus securing the frames 27 and 28 in which the dark lenses are mounted out of the line of vision through the clear lenses 19. In the event that the springs 38 become worn and partially lose their elasticity, the screws 40 may be screwed inwardly and secured in position by means of the nuts 41, thus retracting the springs 38 and increasing the force exerted by the springs on the studs 36 and consequently increasing the friction between the studs 36 and the lugs 22.

The frames 27 and 28 have slots 42 formed therein and in these slots I provide dark lenses 43 and 44 which may be of any color and type as will best serve the purpose.

It will be seen, therefore, that when desiring not to use the dark colored lenses 43 and 44, the wearer of my improved goggles may move them upwardly out of the line of vision by grasping the ear 31 and the pressure exerted by the springs 38 on the studs 36 and in turn the friction of the studs 36 against the lugs 22 will support the frames 27 and 28 and enclosed dark lenses 43 and 44 in any convenient angle out of the line of vision. It will likewise be seen that when the dark lenses 43 and 44 are moved upwardly out of the line of vision the wearer may use the clear lenses 19 for any purpose requiring protection of the eyes against flying chips or splinters of metal and the like without necessitating a change of goggles or the wearing of two different goggles.

From the foregoing description of my invention it is manifest that I have provided an improved construction in goggles which while effectively serving its several objects will be highly efficient in use and economical in manufacture.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In goggles, eye pieces adapted to house transparent lenses and interconnected by a head band, a boss projecting from each eye piece at the front thereof, a pair of frames each housing a colored lens, means for interconnecting said frames to said bosses, said means comprising a tubular member on each of said frames and including portions pivotally connected to each of said bosses, a stud in each of said tubular members, and a spring in each of said tubular members having one end bearing against said stud whereby to force said studs into frictional engagement with said bosses to retain said frames in a predetermined position with respect to said transparent lenses.

2. In goggles, eye pieces adapted to house transparent lenses and interconnected by a head band, a boss projecting from each eye piece at the front thereof, a pair of frames each housing a colored lens, means for interconnecting said frames to said bosses, said means comprising a tubular member on each of said frames and including portions pivotally connected to each of said bosses, a stud in each of said tubular members, a spring in each of said tubular members having one end bearing against said stud whereby to force said studs into frictional engagement with said bosses to retain said frames in a predetermined position with respect to said transparent lenses, and means for adjusting the tension of said springs including a member threaded into the end of each of said tubular members opposite said bosses.

In testimony whereof I affix my signature.

LESLIE E. PARSONS.